United States Patent [19]
Stebleton

[11] 3,708,324

[45] Jan. 2, 1973

[54] METHOD OF GROWING SILICONE ELASTOMER

[75] Inventor: Leo F. Stebleton, Midland, Mich. 48640

[73] Assignee: Dow Corning Corp., Midland, Mich.

[22] Filed: June 1, 1970

[21] Appl. No.: 42,589

[52] U.S. Cl. .................117/47 R, 117/54, 117/62.1, 117/62.2, 117/47 A, 117/72, 117/76 T, 117/75, 117/113, 117/123 D, 117/124 E, 117/126 GS, 117/135.1, 117/138.8 A, 117/148, 117/155 R, 117/161 ZA, 264/306, 128/349 B

[51] Int. Cl. ...........................................B44d 1/092

[58] Field of Search ........117/62.1, 62.2, 47 R, 47 A, 117/161 ZA, 72, 76 T, 126 GS, 75, 54, 113, 135.1, 135 R, 138.8 A, 148, 123 D, 124 F; 264/306; 128/349 B

[56] References Cited

UNITED STATES PATENTS

| | | | |
|---|---|---|---|
| 3,373,049 | 3/1968 | Nitzsche et al. | 117/54 |
| 3,567,493 | 3/1971 | Wessel | 117/161 ZA |
| 3,595,832 | 7/1971 | Szendrey | 117/161 ZA |
| 3,619,256 | 11/1971 | Pepe | 117/124 F |
| 2,174,013 | 9/1939 | Schrey | 117/DIG. 8 |
| 3,203,825 | 8/1965 | Stevens | 117/62.1 |
| 3,411,982 | 11/1968 | Kavalir et al. | 264/306 |
| 3,463,660 | 8/1969 | Bentley et al. | 117/161 ZA |
| 3,539,674 | 11/1970 | Dereniuk et al. | 264/306 |
| 3,547,126 | 12/1970 | Birtwell | 128/349 B |

FOREIGN PATENTS OR APPLICATIONS

| | | | |
|---|---|---|---|
| 680,886 | 2/1964 | Canada | 117/62.2 |

Primary Examiner—William D. Martin
Assistant Examiner—David Cohen
Attorney—Robert F. Fleming, Jr., Laurence R. Hobey, Harry D. Dingman, Howard W. Hermann and Roger H. Borrousch

[57] ABSTRACT

Silicone rubber is grown on a substrate by placing a substrate having a curing catalyst on the surface in contact with an uncatalyzed silicone elastomer composition for a time sufficient to grow silicone elastomer and then removing the substrate from the uncatalyzed silicone elastomer composition. This method is useful in coating substrates with silicone elastomer and in making silicone elastomer devices.

47 Claims, No Drawings

METHOD OF GROWING SILICONE ELASTOMER

This invention relates to a method of coating substrates or manufacturing devices of silicone elastomer. More particularly, this invention relates to a method of growing silicone elastomer on a substrate to coat the substrate with silicone elastomer or to make a device of silicone elastomer.

Coating of substrates with silicone elastomer, as well as, resins has been know since shortly after the development of silicones. The coatings were applied from solution by dipping, roller coating, spraying, molding and the like. The coatings were also applied by similar techniques from undiluted silicone compositions, if the silicone composition would allow the technique in view of its physical form. The techniques used resulted in thin coatings, for example, when dipping was used and to build up a satisfactory coating a number of dips were usually required. The coated product was then heated to cure the silicone composition. Although some silicone compositions are curable at low temperatures, such as room temperature, their use in coatings has been relatively limited.

It is therefore an object of the present invention to provide a method for using low temperature curing silicone elastomer compositions for coating substrates to provide a sufficient coating with a small number of applications. Other objects will become apparent from the following detailed description of the present invention.

This invention relates to a method of growing silicone elastomer on a substrate comprising placing a substrate having a curing catalyst for an uncatalyzed silicone elastomer composition on the surface thereof in contact with an uncatalyzed silicone elastomer composition for a time sufficient to grow silicone elastomer on the surface of the substrate and thereafter separating the substrate from the uncatalyzed silicone elastomer composition.

A substrate having a curing catalyst for an uncatalyzed silicone elastomer composition on its surface is placed in contact with uncatalyzed silicone elastomer composition. This substrate is left in contact with the uncatalyzed silicone elastomer composition for a time sufficient to grow the silicone elastomer on the surface of the substrate. As soon as the substrate having the curing catalyst on its surface comes in contact with the uncatalyzed silicone elastomer composition, the silicone elastomer begins growing on the surface and the longer the substrate is left in contact with the uncatalyzed silicone elastomer composition, the more silicone elastomer will grow on its surface. The silicone elastomer will continue to grow on the substrate's surface until the curing catalyst is exhausted which could result from consumption in the curing process as is the case with some curing catalysts, by being trapped in the cured matrix, by being diluted and the like.

The growth of the silicone elastomer is believed to result from the diffusion of the curing catalyst into the uncatalyzed silicone elastomer composition. This diffusion immediately begins the curing process, beginning with gelling the uncatalyzed silicone elastomer composition, and as the curing catalyst continues to diffuse the silicone elastomer grows thicker and thicker on the surface of the substrate.

In the method of growing silicone elastomer on a substrate, the curing catalyst for the uncatalyzed silicone elastomer composition can be in a form, such as a liquid, which could be disturbed by placing the substrate having the curing catalyst on its surface in contact with the uncatalyzed silicone elastomer composition. Curing catalyst applied evenly over the substrate surface for the purpose of obtaining an even coating of silicone elastomer by growing, should not be disturbed such that the curing catalyst has a reduced concentration in some areas and higher concentrations in other areas of the substrate. This problem with some curing catalysts can be avoided by using a substrate with a thin coat of uncatalyzed silicone elastomer composition on its surface and applying the curing catalyst for the uncatalyzed silicone elastomer composition over the surface so coated. The curing catalyst regardless of form would be held in or on the matrix of the uncatalyzed silicone elastomer composition which would be in at least a gelled state and thus when the substrate having a curing catalyst on its surface is placed in contact with the uncatalyzed silicone elastomer composition, the curing catalyst is not disturbed from its intended place on the substrate surface. There is no need to have an even distribution of the curing catalyst on the substrate surface, but it is desirable to have the curing catalyst remain essentially as placed on the surface of the substrate.

The substrate is preferably (A) coated with a thin coat of an uncatalyzed silicone elastomer composition where the silicone elastomer composition is an organosiloxane elastomer composition. The uncatalyzed organosiloxane elastomer composition can be coated on the substrate by any convenient method for the particular substrate type or shape. For example, if the substrate is in a sheet form, the substrate can be coated with a thin coat by roller coating, calendering, brushing, spraying, dipping and the like. If the substrate is another shape, such as a rod, it could be coated with a thin coat by extruding, dipping, etc. Thus, the shape of the particular substrate will determine the best method of coating with a thin coat of uncatalyzed organosiloxane elastomer composition. The most preferred method for coating the substrate with a thin coat of an uncatalyzed organosiloxane elastomer composition, step (A), is to dip the substrate in an organic solvent dispersion of an uncatalyzed organosiloxane elastomer composition whereby a thin coating of the uncatalyzed organosiloxane elastomer composition exists on the surface of the substrate.

The curing catalyst (B) is applied over the thin coat of uncatalyzed organosiloxane elastomer composition on the surface of the substrate by spraying, dipping, powdering, or other convenient methods. The curing catalyst so applied diffuses into the thin coat of uncatalyzed organosiloxane elastomer composition and adheres to the surface of the thin coat of uncatalyzed organosiloxane elastomer composition. This keeps the curing catalyst stationary during (C) the placement of the coated substrate in an uncatalyzed silicone elastomer composition. The uncatalyzed silicone elastomer composition is preferably an uncatalyzed organosiloxane elastomer composition in the form of an organic solvent dispersion. The coated substrate is placed in the organic solvent dispersion of the uncatalyzed organosiloxane elastomer composition for a time sufficient to grow organosiloxane elastomer on its coated surface. Preferably, a sufficient time to allow growth of organosiloxane elastomer on the coated substrate is at least one minute. After the organosiloxane elastomer has grown sufficiently for a particular purpose, the coated substrate (D) is removed from the organic solvent dispersion of the uncatalyzed organosiloxane elastomer composition.

A preferred method for applying the curing catalyst, step (B), is by dipping the substrate which is coated with a thin coat of the uncatalyzed organosiloxane elastomer composition in an organic solvent solution of a curing catalyst for the uncatalyzed organosiloxane elastomer composition whereby the curing catalyst diffuses into and adheres to the thin coat of the uncatalyzed organosiloxane elastomer composition on the substrate. Since all curing catalysts are not liquid and since the organic solvent aids the diffusion into the uncatalyzed organosiloxane elastomer composition, it is desirable to dip the substrate having the thin coat of uncatalyzed organosiloxane elastomer composition into an organic solvent solution of the curing catalyst. This process also aids in the even distribution over the surface of the substrate with the thin coating and even distribution into the thin coating.

When cross-linking agents have very high solubilities in the organic solvents used, the tendency to leach out of the organosiloxane elastomer composition is increased. The leaching problem can be overcome as follows. The organic solvent dispersion of the uncatalyzed organosiloxane elastomer composition, step (A), is an organic solvent dispersion of an organosiloxane polymer and a filler. In step (B), the substrate which is coated with the thin coat of uncatalyzed organosiloxane elastomer composition is dipped in an organic solvent solution of a cross-linker for the organosiloxane polymer and a curing catalyst for the organosiloxane polymer and cross-linker combination, whereby curing catalyst and cross-linker diffuse into and adhere on the thin coat of the uncatalyzed organosiloxane elastomer composition on the substrate. The uncatalyzed organosiloxane elastomer composition of step (A) and step (C) can be the same or different, it is most convenient to have the same uncatalyzed organosiloxane elastomer composition for both steps. This method where the cross-linker and curing catalyst are both in the same organic solvent solution is particularly well suited where the cross-linker is trimethoxysilane, $HSi(OCH_3)_3$. The presence of the silicon-bonded hydrogen atoms in the cross-linker have a tendency to be unstable in the presence of filler and organosiloxane polymer and sometimes undesirable results are obtained if this cross-linker would be present in the uncatalyzed organosiloxane elastomer composition, such as a highly wrinkled surface. Since wrinkled surfaces are usually not desirable, the use of trimethoxysilane as cross-linker should be used in the above described method instead of incorporation with the organosiloxane polymer and filler.

After the substrate with the thin coat of uncatalyzed organosiloxane elastomer composition is dipped in the organic solvent solution of curing catalyst, step (B), it is desirable to expose it to an atmosphere for at least 30 seconds before placing it in the organic solvent dispersion of uncatalyzed organosiloxane elastomer composition, step (C). This allows any excess organic solvent solution of the curing catalyst to run off the substrate, also allows time to get a strong gel which can be put into the dispersion without distortion and also can allow evaporation of the organic solvent. Depending upon the organosiloxane elastomer composition and curing catalyst, any reasonable atmosphere is suitable, such as air, nitrogen, carbon dioxide, organic solvent, helium and the like. Highly reactive or deleterious atmospheres such as hydrogen chloride, should be avoided, these should be apparent to those skilled in the art of silicone elastomers. An air atmosphere can give a final product with a dull appearing surface or a glossy surface depending on formulation whereas organic solvent atmospheres give glossy surfaces for the most part. Organic solvent atmospheres can include atmospheres of just organic solvent per se, atmospheres where air is saturated with organic solvent or nitrogen saturated with organic solvent or air or nitrogen containing a substantial partial pressure of organic solvent. The entire process steps (A) through (D) can be carried out under an organic solvent atmosphere.

The resulting product from step (D) is a substrate coated with a gelled matrix of organosiloxane elastomer which has grown to a certain thickness. This product when exposed to curing conditions, such as ambient atmosphere, heated or the like, cures to an organosiloxane elastomer. However, a faster and better cure is obtained if the resulting coated substrate from step (D) is dipped in the curing catalyst solution of (B). Improved final products are obtained where the resulting coated substrate from step (D) is exposed to an air atmosphere for at least one minute before dipping in the curing catalyst solution, step (B). Excellent results are also obtained when the exposure to the air atmosphere is continued until the coated substrate is essentially free of organic solvent before dipping in the catalyst solution. Furthermore, a coated substrate which has been dipped in the curing catalyst solution after step (D) provides a smoother and glossier surface if exposed to an atmosphere of low moisture content such as low humidity air or an organic solvent atmosphere for at least one minute after the final dipping in curing catalyst solution and before exposure to the curing conditions. It is believed that this treatment allows the coating on the substrate to equalize with respect to solvent and catalyst concentration throughout the coating.

The uncatalyzed organosiloxane elastomer composition can consist essentially of a polydiorganosiloxane terminated with hydroxyl radicals or alkoxy radicals and a cross-linking agent which is a silicon compound. The silicon compounds useful as cross-linking agents are preferably alkoxy silicon compounds or organohydrogen silicon compounds, although the present invention is not limited to such cross-linking agents. The uncatalyzed organosiloxane elastomer composition can also be a polydiorganosiloxane terminated with hydroxyl radicals or triorganosiloxy radicals and having at least two vinyl radicals per molecule and organosilicon compounds having at least two silicon-bonded hydrogen atoms per molecule. These uncatalyzed organosiloxane elastomer compositions illustrate the type of elastomeric compositions suitable in the present invention. Other details are discussed below. Fillers can be used in the uncatalyzed organosiloxane elastomer compositions but are not required. Fillers can be reinforcing fillers as well as extending or non-reinforcing fillers. The present invention relates to any uncatalyzed organosiloxane elastomer composition which can be gelled by a curing catalyst for that uncatalyzed organosiloxane elastomer composition. The uncatalyzed organo-siloxane elastomer composition can be used in the present invention either at ambient temperatures or heated to some higher temperature. Curing catalysts which may diffuse slowly at room temperature or gel the uncatalyzed organosiloxane elastomer composition too slowly at room temperature are effective when the uncatalyzed organosiloxane elastomer composition is heated.

After step (D) as described above steps (B), (C) and (D) can again be repeated to provide a substantial increase in the thickness of the organosiloxane elastomer. These steps can be repeated as many times as desired to build up very thick coatings. For most purposes, however, repeating more than twice is not necessary.

Organosiloxane elastomer devices can be made by removing the cured organosiloxane elastomer from the substrate. Under such conditions, it is desirable to apply a release agent to the surface of the substrate before step (A). Where the substrate is polytetrafluoroethylene, a release agent need not be used. This will allow easy removal of the cured organosiloxane elastomer from the substrate.

In the method of growing silicone elastomer, the organic solvent dispersion of uncatalyzed organosiloxane elastomer composition in step (C) can be vibrated to provide maximum penetration into all the surface irregularities, such as between the windings of a coil, a sharp crease in the surface of a substrate, between the threads of cloth and the like, such that any voids are minimized or eliminated. Preferably, the organic solvent dispersion of the uncatalyzed organosiloxane elastomer composition in step (C) is vibrated during the placing of the substrate into it and during the removal therefrom but is not vibrated while the organosiloxane elastomer is growing.

The uncatalyzed silicone elastomer composition can vary broadly for the purpose of the present invention. Silicone elastomer compositions are well known in the art and are available commercially. Organosiloxane elastomer compositions are the most common and are also the most practical. Basically the uncatalyzed organosiloxane elastomer compositions are polydiorganosiloxanes. The uncatalyzed organosiloxane elastomer compositions can also contain other ingredients such as fillers, additives such as pigments, antioxidants and the like and cross-linkers. As stated above the cross-linker can be used either with the uncatalyzed organosiloxane elastomer composition or with the curing catalyst. If the cross-linker is unstable with either the uncatalyzed organosiloxane elastomer composition or the curing catalyst, stability can usually be gained by incorporating the cross-linker with the other. The uncatalyzed organosiloxane elastomer composition is all the ingredients of an organosiloxane elastomer composition except the curing catalyst or the curing catalyst and cross-linker, as the case may be. Thus, the organo-siloxane elastomer compositions are those well known in the art. All organosiloxane elastomer compositions are not equivalent with respect to convenience of using in the present invention, to be practical and to being capable of commercialization. Therefore, the most readily adaptable organosiloxane elastomer compositions will be used to illustrate the method of growing silicone elastomer as described herein.

Silicone elastomer compositions can be illustrated by those comprising a hydroxyl endblocked diorganopolysiloxane, an alkoxysilicon compound and a curing catalyst. The alkoxysilicon compounds can be, for example, alkoxysilanes, reaction product of a tin salt of a carboxylic acid and an alkyl silicate, alkoxydisilane, organic silicate, polyvinylalkoxysilane, bis(alkoxysilyl)hydrocarbon compound, cellosolvoxysilane, and partial hydrolyzates thereof. Curing catalyst can be, for example, metal salts of a carboxylic acid, a condensation product of an aliphatic aldehyde and an aliphatic primary amine, organozirconates, organotitanates, organosiloxytitanates and amines. Additional details can be found, with respect to specific compositions of silicone elastomer compositions of this type, in the following patents which are hereby incorporated by reference: U.S. Patent Nos. 2,833,742 (Koch), 2,843,555 (Berridge) 2,902,467 (Chipman), 2,927,907 (Polmanteer), 2,983,694 (Page et al.), 3,065,194 (Nitzsche et al.), 3,070,559 (Nitzsche et al.), 3,070,566 (Nitzsche et al.), 3,109,826 (Smith), 3,110,689 (Smith), 3,127,363 (Nitzsche et al.), 3,151,099 (Ceyzeriat et al.), 3,154,515 (Berridge), 3,165,494 (Smith), 3,186,963 (Lewis et al.), 3,305,502 (Lampe) and 3,470,221 (Chadha et al.).

Illustrative of silicone elastomer compositions are the following comprising a hydroxyl endblocked diorganopolysiloxane, an organohydrogensiloxane as a cross-linker and a curing catalyst, such as stannous salts of a carboxylic acid, other metallic salts of carboxylic acids, organic acids and the like. Additional details can be found, with respect to specific compositions of silicone elastomer compositions of this type, in the following patents which are hereby incorporated by reference: U.S. Patent Nos. 2,999,077 (Nitzsche et al.), 3,070,559 (Nitzsche et al.), 3,070,566 (Nitzsche et al.), and 3,127,363 (Nitzsche et al.).

Also illustrative of silicone elastomer compositions are those comprising an alkenyl unsaturated polydiorganosiloxane, such as a vinyl containing polydiorganosiloxane, and organohydrogensiloxane as a cross-linker and a curing catalyst, such as platinum catalyst, illustrated by chloroplatinic acid. Additional details can be found, with respect to specific compositions of silicone elastomer compositions of this type, in the following patents which are herby incorporated by reference: U.S. Patent Nos. 2,823,218 (Speier et al.), 3,159,601 (Ashby), 3,159,662 (Ashby), 3,220,972 (Lamoreaux), 3,249,581 (Nelson), 3,284,406 (Nelson) and 3,436,366 (Modic).

The organic solvents used in making the curing catalyst solutions can be any of those in which the particular curing catalyst is soluble, but should not destroy the curing catalyst. Organic solvents which would be detrimental to the silicone elastomer should also be avoided. The organic solvents used in making the organic solvent dispersions of the uncatalyzed silicone elastomer compositions can be the same as for the solution of curing catalyst or different except alcohols in amount greater than a few weight percent of the total solvent should not be used except for the curing catalyst solution. It is to be understood that organic solvent dispersions can be made with any of the uncatalyzed silicone elastomer compositions, however, it is not necessary to use organic solvent dispersions when the uncatalyzed silicone elastomer composition has relatively low viscosities. Illustrative of the organic solvents are alcohols, ethers, halogenated hydrocarbons, hydrocarbons, ketones and esters. Some examples are benzene, toluene, xylene, white spirit, mineral spirits, methylethylketone, 1,1,1-trichloroethane, monochlorobenzene, trichlorotrifluoroethane, dioxane, tetrahydrofuran, diethyl ether, tetrahydropyran, dipropylether, dibutyl ether, dimethyl ether of diethylene glycol, ethanol, n-propyl alcohol, isopropyl alcohol, butanol, furfuryl alcohol, petroleum ethers, amyl alcohol and monomethyl ether of diethylene glycol.

The substrates can vary broadly and can be illustrated by glass, metal, such as copper, aluminum, steel, paper, fabric, thermoplastics, rubber, resins, wood and ceramics. The form can be of any type from sheets and rods to screen and cloth to detailed shapes like coils and catheters.

The curing catalyst can be applied in widely varying concentrations, from very dilute solutions such as 1 or 2 percent in organic solvent up to 100 percent curing catalyst, preferably from about 1 to 30 percent curing catalyst in organic solvent.

The uncatalyzed silicone elastomer composition can vary broadly from dilute organic solvent dispersions up to 100 percent uncatalyzed silicone elastomer composition. Since the substrate is brought into contact with the uncatalyzed silicone elastomer composition, the viscosity of the uncatalyzed silicone elastomer composition should be such that the substrate can be contacted without undue difficulty. The viscosity of the uncatalyzed silicone elastomer composition, in dispersion form or otherwise, is from 1,000 to 10,000 cs. at 25° C. for a practical range, however, lower and higher viscosity can also be used. Organic solvent dispersions of the uncatalyzed silicone elastomer composition preferably range from 20 to 75 percent of the uncatalyzed silicone elastomer composition. The uncatalyzed silicone elastomer composition of (A) can be of a different viscosity and concentration than that of (C). Since step (A) only requires a thin coating of uncatalyzed silicone elastomer composition, the viscosities and concentrations can be lower than those of step (C).

The preferred hydroxyl endblocked polydiorganosiloxanes are those having viscosities from 1,000 to 2,000,000 cs. at 25° C. and most preferred from 10,000 to 750,000 cs. at 25° C. where the number average molecular weights can vary from less than 15,000 to more than 1,000,000 and the diorganosiloxane units are one or more types of dimethylsiloxane, phenylmethylsiloxane, diphenylsiloxane, and 3,3,3-trifluoropropylmethylsiloxane.

The thickness of the silicone elastomer which grows on the substrate is approximately proportional to the square root of the time allowed for growth. The thickness of the silicone elastomer which grows on the substrate also depends upon the rate of migration of the catalyst into the dispersion, the rate of gellation, the time allowed for growing, the concentration of the uncatalyzed silicone elastomer composition in the growing step (C), and the concentration of the catalyst. From this it was found that the thickness of the coating grown could be readily controlled to a desired thickness. The most important consideration is the time allowed for growth, since the thickness is proportional to the square root of the time allowed. The rate of migration of the catalyst into the dispersion and the rate of gellation are closely related to the time allowed for growth. The thickness of the grown coating increases as the concentration of both the catalyst and uncatalyzed silicone elastomer composition increase. Also heated dispersions increase the rate of growth of the silicone elastomer on the substrate.

The uncatalyzed silicone rubber compositions, particularly the organic solvent dispersions, are preferably agitated prior to the placement of the substrate into it. Some of the dispersions are of a thixotropic nature and thus by agitating, such as by stirring, by circulating through a pump, etc., the dispersion is fluidized and placement of the substrate into the dispersion causes no problems. The placement of the substrate in the dispersion and removal therefrom is preferably done slowly and at some controlled rate for best results.

The method of growing silicone elastomer on a substrate provides uniform coating on all surfaces including sharp corners and edges. Since regular dipping processes require high viscosity solutions to get thicker coatings, the present method can use low viscosity compositions to get thicker coatings than the regular dipping method. The lower viscosities also allow good run off from the coated substrate and thus variations from the top of the substrate to the bottom are relatively small in the present method. Complex objects can be coated uniformly. Thicker coatings can be made with one growing process than with several dips of a regular dipping process. The present growing process is practical, fast and permits versatility in formulating. The thickness of the coating is easy to control and the process can be automated. The raw materials are more completely used with smaller losses than dipping processes. The finished products require little labor to provide the finishing, since the surfaces can be made smooth and glossy or smooth and dull and the like as one desires.

The present process can be used to coat coils, printed circuits, cloth, screen, television flyback transformers and many other simple and complex substrates. Another area where the present process finds particular utility is in the manufacture of medical devices which cannot be conveniently made of other dipping processes, such as Foley catheters, T-tubes, endotracheal tubes with cuffs and suprapubic drains. In these medical cases described herein, the grown silicone elastomer is removed from the substrate to provide a silicone elastomer device.

The following examples are for illustrative purposes only and should not be construed as limiting the present invention which is properly delineated in the claims. All parts are parts by weight unless otherwise stated and all viscosities are at 25° C. unless otherwise stated.

EXAMPLE 1

An aluminum panel was placed in a dispersion of 100 parts of a hydroxyl endblocked polydimethylsiloxane having a viscosity of 12,500 cs., 18 parts of a reinforcing silica filler having trimethylsiloxy surface treatment, 2.4 parts of phenyltrimethoxysilane and 118 parts of toluene to provide a dispersion of uncatalyzed silicone elastomer composition in toluene. The aluminum panel was removed from the dispersion at the rate of 4 inches per minute. The aluminum panel was coated with a thin layer of uncatalyzed silicone elastomer composition. The aluminum panel was air dried for one minute and then immersed into a 20 weight percent solution of stannous octoate in trichlorotrifluoroethane and immediately removed. The catalyst containing substrate was air dried for one minute and then immersed in a dispersion as described above except 69.3 parts of toluene was used instead of 118 parts, to provide a 63 weight percent dispersion of uncatalyzed silicone elastomer in toluene. The substrate was left in this dispersion for varying times to grow different thicknesses of silicone rubber. The time was as shown in Table I. After the growth period, the substrate with a coating of silicone elastomer grown on its surface was then removed at the rate of 4 inches per minute. The substrate with the grown silicone elastomer on its surface was then immersed in the catalyst solution and immediately removed. The coated panel was then allowed to air dry overnight and the thickness of the coating was measured at the top and bottom of the panel. The results were as shown in Table I.

TABLE I

| Growing Time, Minutes | Thickness, inches | |
|---|---|---|
| | Top | Bottom |
| 0.5 | 0.0265 | 0.031 |
| 1.0 | 0.029 | 0.032 |
| 1.5 | 0.032 | 0.036 |
| 2 | 0.035 | 0.037 |
| 3 | 0.036 | 0.039 |
| 4 | 0.040 | 0.042 |
| 5 | 0.043 | 0.047 |
| 10 | 0.050 | 0.052 |

EXAMPLE 2

The following uncatalyzed silicone elastomer compositions were prepared

A. 100 parts of a hydroxyl endblocked polydimethylsiloxane having a viscosity of 12,500 cs., 18 parts of a reinforcing silica filler having trimethylsiloxy surface treatment, 2.4 parts of phenyltrimethoxysilane and 275.3 parts of toluene providing a dispersion of uncatalyzed silicone elastomer composition in toluene, B. The uncatalyzed silicone elastomer composition as described in Example 1 being the dispersion of uncatalyzed silicone elastomer composition having 118 parts of toluene, and C. The uncatalyzed silicone elastomer composition as described in A. above except having 78.7 parts toluene instead of 275.3 parts providing a dispersion of uncatalyzed silicone elastomer composition in toluene.

A curing catalyst solution of 10 weight percent stannous octoate in trichlorotrifluoroethane was prepared.

The procedure was as follows where each uncatalyzed silicone elastomer composition, A., B. and C. was used in the procedure.

An aluminum panel was immersed in A. and withdrawn at the rate of 4 inches per minute, allowed to air dry for one minute, immersed in the curing catalyst and immediately removed, allowed to air dry for 1 minute, the thickness of the thin coating was measured, immersed in A. and allowed to grow for 10 minutes, withdrawn at the rate of 4 inches per minute, immersed in the curing catalyst and immediately removed, allowed to air dry overnight and the thickness of the grown coat was measured. A second coat was grown by air drying a coated substrate as defined above for one minute after the last curing catalyst immersion and then immersing it in A. for another 10 minutes and repeating the rest of the procedure. Additional coats were grown in the same manner.

The Brookfield viscosities at 10 rpm. of the uncatalyzed silicone elastomer compositions were 228 cs. for A., 3,140 cs. for B. and 7,800 cs. for C. The results were as shown in Table II.

TABLE II

| Composition | Precoat | Thickness, Inches | | |
|---|---|---|---|---|
| | | 1 Coat | 2 Coats | 4 Coats |
| A. | 0.001 | 0.0185 | 0.0385 | 0.085 |
| B. | 0.006 | 0.036 | 0.075 | 0.1425 |
| C. | 0.012 | 0.0475 | 0.100 | 0.155 |

EXAMPLE 3

An uncatalyzed silicone elastomer composition was prepared by mixing 100 parts of a hydroxyl endblocked polydimethylsiloxane having a viscosity of 12,500 cs., 40 parts of a reinforcing silica filler having trimethylsiloxy surface treatment, 2.8 parts of phenyltrimethoxysilane and 210 parts of toluene. A curing catalyst solution was prepared by mixing 20 parts of stannous octoate in 80 parts of toluene. The same procedure was used to grow silicone elastomer on aluminum panels as described in Example 2. One coat had a thickness of 0.025 inch, two coats and a thickness of 0.050 inch, three coats had a thickness of 0.0775 inch and four coats had a thickness of 0.1125 inch.

The above was repeated except trichlorotrifluoroethane was used as the solvent for the curing catalyst instead of toluene. Three coats of silicone elastomer were grown on an aluminum panel and the physical properties were determined. The coat of silicone elastomer was 0.0715 inch and had a tensile strength at break of 770 p.s.i., an elongation at break of 420 percent, a die "B" tear strength of 173 p.p.i. and a durometer of 53 on the Shore A scale.

EXAMPLE 4

A dispersion of uncatalyzed silicone elastomer composition was prepared as described in Example 1 having 118 parts toluene. Several curing catalyst solutions were prepared from stannous octoate and trichlorotrifluoroethane varying the concentration of stannous octoate, 2.5 weight percent, 5 weight percent, 10 weight percent and 20 weight percent.

A glass rod was immersed in the dispersion and removed after 30 seconds, allowed to air dry for 2 minutes, immersed in one of the catalyst solutions and immediately removed, allowed to air dry one minute, immersed in the dispersion and allowed to grow for 6 minutes, removal was accomplished in 30 seconds, immersed in the same catalyst solution as used in each case and immediately removed and thereafter allowed to air dry overnight. The weight of the grown coat of silicone elastomer was measured. The results were as shown in Table III.

TABLE III

| Catalyst Solution,% | Weight of Silicone Elastomer, g. |
|---|---|
| 2.5 | 2.49 |
| 5.0 | 2.87 |
| 10.0 | 3.03 |
| 20.0 | 3.35 |

EXAMPLE 5

The following dispersions of uncatalyzed silicone elastomer compositions and curing catalyst solutions were used to grow silicone elastomer on glass rods. In each case the hydroxyl endblocked polydimethylsiloxane (referred to as polymer below) and the silica filler used in the dispersion was the same as described in Example 1. The procedure used to grow silicone elastomer on glass rods was the same as described in Example 2. The temperature of the dispersion in which the silicone elastomer was grown was as shown with each combination of dispersion and curing catalyst solution.

A. Dispersion: 100 parts polymer
40 parts filler
2.8 parts phenyltrimethoxysilane
210 parts toluene
Temperature: room temperature and 75°C.
Catalyst Solution: 10 parts stannous octoate
90 parts toluene B. Dispersion: 100 parts polymer
40 parts filler
2.8 parts phenyltrimethoxysilane
326.7 parts xylene
Temperature: room temperature
Catalyst Solution: 16 parts dibutyltindiacetate
84 parts xylene C. Dispersion: 100 parts polymer
40 parts filler
2.8 parts phenyltrimethoxysilane
210 parts xylene
Temperature: room temperature and 75°C.
Catalyst Solution: 9 parts diphenylguanidine
91 parts xylene D. Dispersion: 100 parts polymer
40 parts filler
2.8 parts ethylpolysilicate
210 parts xylene
Temperature: room temperature and 75°C.
Catalyst Solution: 9 parts diphenylguanidine
91 parts of a xylene-isopropyl alcohol mixture E. Dispersion: 100 parts polymer
40 parts filler
2.8 parts of a trimethylsiloxy endblocked polymethylhydrogensiloxane having an average of 30 siloxane units per molecule.
210 parts xylene
Temperature: room temperature
Catalyst Solution: 16 parts dibutyltindiacetate
84 parts xylene F. Dispersion: 100 parts polymer
40 parts filler
2.8 parts of the methylhydrogensiloxane polymer of E. above.
140 parts xylene
Temperature: 75°C.
Catalyst Solution: 15 parts lead naphthenate
85 parts xylene G. Dispersion: 100 parts polymer
40 parts filler
1.4 parts trimethoxysilane
210 parts xylene
Temperature: room temperature
Catalyst Solution: 10 parts dibutyltindiacetate
90 parts xylene H. Dispersion: 100 parts polymer
40 parts filler
210 parts xylene
Temperature: room temperature
Catalyst Solution: 10 parts trimethoxysilane
10 parts dibutyltindilaurate
80 parts xylene I. Dispersion: 100 parts polymer
40 parts filler
210 parts xylene
Temperature: room temperature
Catalyst Solution: 2.5 parts trimethoxysilane
2.6 parts dibutyltindilaurate
94.9 parts xylene J. Dispersion: 100 parts polymer
40 parts filler
5.6 parts $Si(OCH_2CH_2OC_4H_9)_4$
210 parts xylene
Temperature: room temperature
Catalyst Solution: 10 parts dibutyltindiacetate
90 parts xylene

EXAMPLE 6

Silicone elastomer was grown on glass rods using the dispersions of uncatalyzed silicone elastomer compositions and curing catalyst solutions as described below. The growing procedure was as follows: A glass rod was immersed three times in a trichlorotrifluoroethane solution of a commercial release agent, air dried, immersed in the dispersion and immediately withdrawn, allowed to air dry one minute, immersed in the catalyst solution for 10 seconds, allowed to air dry for one minute, immersed in the dispersion and allowed to grow for 5 minutes, allowed to air dry for one minute after removal from the dispersion, immersed in the catalyst solution for 10 seconds and thereafter allowed to cure by exposure to air at room temperature.

The polymer in each case was a hydroxyl endblocked poly-3,3,3-trifluoropropylmethylsiloxane of a viscosity as indicated.

A. Dispersion: 100 parts polymer, 47,800 cs.
13.3 parts reinforcing silica filler
3 parts 3,3,3-trifluoropropyltrimethoxysilane
90 parts methylethylketone
Catalyst Solution: 20 parts stannous octoate
80 parts methylethylketone B. Dispersion: 100 parts polymer, 47,800 cs.
13.3 parts reinforcing silica filler
3 parts 3,3,3-trifluoropropyltrimethoxysilane
50 parts methylethylketone
Catalyst Solution: 20 parts stannous octoate
80 parts methylethylketone C. Dispersion: 100 parts polymer, 47,800 cs.
13.3 parts reinforcing silica filler
4.2 parts ethylorthosilicate
7.1 parts of a plasticizer
138.5 parts 1,1,1-trichloroethane
Catalyst Solution: 20 parts stannous octoate
2.8 parts of a plasticizer
80 parts of 1,1,1-trichloroethane D. Dispersion: 100 parts polymer, 47,800 cs.
13.3 parts reinforcing silica filler
4.4 parts of a trimethylsiloxy endblocked polymethylhydrogensiloxane having an average of 30 siloxane units per molecule
185 parts of 1,1,1-trichloroethane
Catalyst Solution: 20 parts stannous octoate
80 parts 1,1,1-trichloroethane E. Dispersion: 100 parts polymer, 37,500 cs.
27 parts of a reinforcing silica filler having trimethylsiloxy surface treatment

|                    | 4.9       | parts of the methylhydrogensiloxane polymer of D. above |
|                    | 207.2     | parts 1,1,1-trichloroethane |
| Catalyst Solution: |           | 20 parts stannous octoate |
|                    |           | 80 parts trichlorotrifluoroethane |
| F. Dispersion:     | 100       | parts polymer, 47,800 cs. |
|                    | 13.3      | parts reinforcing silica filler |
|                    | 11.2      | parts 3,3,3-trifluoropropyltrimethoxysilane |
|                    | 113.3 parts | trichlorotrifluoroethane |
| Catalyst Solution: |           | 20 parts stannous octoate |
|                    |           | 80 parts trichlorotrifluoroethane |
| G. Dispersion:     | 100       | parts polymer, 47,800 cs. |
|                    | 13.3      | parts reinforcing silica filler |
|                    | 4.5       | parts ethylorthosilicate |
|                    | 6.7       | parts of plasticizer |
|                    | 210.4     | parts of trichlorotrifluoroethane |
| Catalyst Solution: |           | 20 parts stannous octoate |
|                    |           | 80 parts trichlorotrifluoroethane |

EXAMPLE 7

A mixture was prepared containing 100 parts of a dimethylvinylsiloxy endblocked polydiorganosiloxane containing dimethylsiloxane units and methylvinylsiloxane units, having a viscosity of 1,350 cs. and 0.35 weight percent vinyl, 5 parts of a dimethylhydrogensiloxy endblocked polydimethylsiloxane having an average of 5 dimethylsiloxane units per molecule, and 0.5 parts of a benzene soluble copolymer consisting of dimethylhydrogensiloxane units and $SiO_2$ units having 1.0 weight percent silicon-bonded hydrogen atoms. A catalyst solution was prepared by mixing 1 part of a dimethylvinylsiloxy endblocked polydiorganosiloxane gum having dimethylsiloxane units and methylvinylsiloxane units, a plasticity of 0.060 inch and 0.50 weight percent vinyl radicals, 19 parts of toluene and $2.85 \times 10^{-4}$ parts of platinum added in the form of a chloroplatinic acid catalyst. A metal paper clip was dipped into the catalyst solution, removed and air dried for 5 minutes and then heated for 3 minutes at 149° C. This paper clip was then immersed in the polymer mixture for 15 minutes, removed, air dried and heated for three minutes at 149° C. A coating of silicone rubber of about 5 mils was grown on the paper clip. No coating formed on the paper clip, when the above was repeated without the platinum catalyst.

A metal paper clip was dipped in the catalyst solution, removed and air dried for 15 minutes. The polymer mixture was heated to 93° C. The paper clip with catalyst was immersed in the heated polymer mixture and a silicone rubber coating was allowed to grow for 15 minutes. The paper clip was then removed, air dried for 30 minutes at room temperature and then heated at 149° C. for 5 minutes. The coating of silicone rubber was about 12 mils thick on the paper clip.

To the polymer mixture, about 7.5 weight percent calcium carbonate was added. A paper clip was dipped in the catalyst solution and air dried for 30 minutes. The catalyst containing paper clip was immersed in the polymer mixture for 15 minutes, removed, air dried at room temperature for 30 minutes and then heated at 149° C. for 5 minutes. A coating of silicone rubber of about 7 mils had grown on the paper clip.

A paper clip was dipped into the polymer mixture containing the calcium carbonate, removed and allowed to drain for 20 minutes. This paper clip was then dipped into a chloroplatinic acid catalyst solvent solution containing 0.40 weight percent platinum, removed immediately and allowed to air dry for 15 minutes. The film thickness was about 3 mils at this point. This coated paper clip was immersed in the polymer mixture for 15 minutes, removed, air dried for 15 minutes at room temperature and then heated at 93° C. for 10 minutes. A coating of silicone rubber of about 13 mils had grown on the surface of the paper clip.

EXAMPLE 8

A dispersion of 100 parts of a hydroxyl endblocked polydimethylsiloxane having a viscosity of 12,500 cs., 40 parts of a reinforcing silica filler having a trimethylsiloxy surface treatment, 210 parts of toluene, 1.4 parts of phenyltrimethoxysilane and 2.8 parts of $(CH_3)_3Si\ OSi(OCH_3)_2C_6H_5$ was prepared. A mixture of equal molar amounts of trimethylsilanol and phenyltrimethoxysilane was refluxed in the presence of a catalytic amount of potassium acetate until all the volatiles, up to about 140° C. were removed. The potassium acetate was filtered to yield $(CH_3)_3SiOSi(OCH_3)_2C_6H_5$. A catalyst solution of 10 parts of stannous octoate, 0.4 part of trimethoxysilane, 0.8 part of $(CH_3)_3Si\ OSi(OCH_3)_2C_6H_5$, 22 parts of a trimethylsiloxy endblocked polydimethylsiloxane having a viscosity of 0.65 cs. and 67.8 parts of toluene was prepared.

The following substrates were coated by growing silicone rubber on their surfaces by dipping the substrate in the dispersion bath and immediately removing the substrate. The substrate was then immersed in the catalyst solution and withdrawn immediately. The resulting catalyzed substrate was then immersed in the dispersion and silicone rubber was allowed to grow for 10 minutes. The substrate with the grown silicone rubber coating was removed and air dried for 5 minutes. The coated substrate was then dipped in the catalyst solution and the dispersion for another 10 minute growth period as described above. The coated silicone rubber coated substrate was then allowed to cure by exposure to air at room temperature. Before each immersion of the substrate into the dispersion, the dispersion was put through a circulating pump. Also the dispersion was vibrated while the substrate was being immersed and while the substrate was being withdrawn from the dispersion.

The substrates used were as described below with the thickness of the silicone rubber coating grown on the surface thereof.

| Substrate            | Thickness, mils |
|----------------------|-----------------|
| Glass cloth          | 50              |
| Motor Coil, 3 feet long | 50           |
| Paper                | 40              |
| Polyester film       | 40              |
| Copper screen        | 40              |
| Steel screen         | 40              |
| Form wound coil      | 35              |

The silicone rubber having a 110 mil thickness had a durometer of 47 on the Shore A scale, a tensile strength at break of 800 p.s.i., an elongation at break of 425 percent and a die "B" tear strength of 150 p.p.i. after curing for 16 hours at 100° C.

EXAMPLE 9

A catheter was prepared by dipping a catheter form having a release agent on its surface in a dispersion as defined in Example 1 to provide a 0.006 inch thickness, dipping in a catalyst solution of 20 parts stannous octoate and 80 parts of trimethylsiloxy endblocked polydimethylsiloxane having a viscosity of 0.65 cs., immersing the catalyst containing catheter form in the dispersion and allowing silicone rubber to grow for 10 minutes, and thereafter air drying for 15 minutes at room temperature. The catheter was dipped in the catalyst solution and the dispersion for 10 minute growth periods as described above for four additional growth periods. The immersion and withdrawal rate was 0.5 inch per minute. The catheter was allowed to cure and removed from the form. The thickness of the catheter was 0.093 inch.

EXAMPLE 10

A Foley was prepared by using a Foley catheter form having a release agent on its surface and the procedure and composition described in Example 8. The growth period was repeated four times and after the final growth period the silicone rubber coating was cured for 16 hours in air at room temperature and then 4 hours at 125° C. The Foley catheter was removed from the form and had a thickness of 0.085 inch.

That which is claimed is:

1. A method of growing silicone elastomer on a substrate comprising applying to the surface of a substrate, coated with a thin coat of an uncatalyzed silicone elastomer composition, a curing catalyst for the uncatalyzed silicone elastomer composition, placing the resulting substrate in an uncatalyzed silicone elastomer composition for a time sufficient to grow gelled silicone elastomer on the surface of the substrate and thereafter removing the substrate having silicone elastomer grown on the surface thereof from the excess uncatalyzed silicone elastomer composition.

2. A method of growing silicone elastomer on a substrate comprising
, coating the substrate with a thin coat of an uncatalyzed organosiloxane elastomer composition,
B. applying a curing catalyst for the uncatalyzed organo-siloxane elastomer composition to the surface of the coated substrate of (A), whereby curing catalyst diffuses into and adheres to the thin coat of the uncatalyzed organosiloxane elastomer composition on the substrate,
C. placing the coated substrate resulting from (B) in an organic solvent dispersion of an uncatalyzed organo-siloxane elastomer composition for a time sufficient to grow organosiloxane elastomer on the surface of the coated substrate, and thereafter
D. removing the coated substrate from the organic solvent dispersion of the uncatalyzed organosiloxane elastomer composition.

3. A method of growing silicone elastomer on a substrate comprising
A. dipping the substrate in an organic solvent dispersion of an uncatalyzed organosiloxane elastomer composition whereby a thin coating of the uncatalyzed organosiloxane elastomer composition is formed on the surface of the substrate,
B. applying a curing catalyst for the uncatalyzed organo-siloxane elastomer composition to the surface of the coated substrate resulting from (A), whereby curing catalyst diffuses into and adheres to the thin coat of the uncatalyzed organosiloxane elastomer composition on the substrate, thereafter
C. placing the coated substrate resulting from (B) in an organic solvent dispersion of an uncatalyzed organosiloxane elastomer composition for at least one minute whereby an organosiloxane elastomer grows on the surface of the coated substrate, and thereafter
D. removing the coated substrate from the organic solvent dispersion of the uncatalyzed organosiloxane elastomer composition.

4. A method of growing silicone elastomer on a substrate comprising
A. dipping the substrate in an organic solvent dispersion of an uncatalyzed organosiloxane elastomer composing whereby a thin coating of the uncatalyzed organosiloxane elastomer composition is formed on the surface of the substrate,
B. dipping the substrate which is coated with a thin coat of the uncatalyzed organosiloxane elastomer composition in an organic solvent solution of a curing catalyst for the uncatalyzed organosiloxane elastomer composition, whereby curing catalyst diffuses into and adheres to the thin coat of the uncatalyzed organosiloxane elastomer composition on the substrate, thereafter
C. placing the coated substrate resulting from (B) in an organic solvent dispersion of an uncatalyzed organosiloxane elastomer composition for at least one minute whereby an organosiloxane elastomer grows on the surface of the catalyst-containing thin coat on the substrate, and thereafter
D. removing the coated substrate from the organic solvent dispersion of the uncatalyzed organosiloxane elastomer composition.

5. The method in accordance with claim 4 in which the coated substrate after (B) and before (C) is exposed to an atmosphere of air, nitrogen, carbon dioxide, organic solvent or helium for at least 30 seconds.

6. The method in accordance with claim 5 in which the atmosphere is air.

7. The method in accordance with claim 5 in which the atmosphere is organic solvent.

8. The method in accordance with claim 4 in which all the steps are carried out in an organic solvent atmosphere.

9. The method in accordance with claim 4 in which the coated substrate resulting from (D) is dipped in the catalyst solution as defined in (B).

10. The method in accordance with claim 9 in which the coated substrate resulting from (D) after the dip in the catalyst solution as defined in claim 9 is exposed to an organic solvent atmosphere for at least one minute and thereafter exposed to curing conditions.

11. The method in accordance with claim 10 in which the cured organosiloxane elastomer is removed from the substrate.

12. The method in accordance with claim 9 in which the product is cured.

13. The method in accordance with claim 12 in which the cured organosiloxane elastomer is removed from the substrate.

14. The method in accordance with claim 9 in which the coated substrate resulting from (D) is exposed to an air atmosphere for at least one minute before dipping in the catalyst solution.

15. The method in accordance with claim 14 in which the exposure to the air atmosphere is continued until the coated substrate is essentially free of organic solvent before dipping in the catalyst solution.

16. The method in accordance with claim 14 in which the silicone elastomer grown on a substrate is cured.

17. The method in accordance with claim 4 in which at least one of the uncatalyzed organosiloxane elastomer compositions consists essentially of a polydiorganosiloxane having terminal radicals selected from the group consisting of hydroxyl radicals and alkoxy radicals and a cross-linking agent which is a silicon compound.

18. The method in accordance with claim 17 in which the cross-linking agent is selected from the group consisting of alkoxy silicon compounds and organohydrogen silicon compounds.

19. The method in accordance with claim 18 in which cross-linking agent also is present in the organic solvent solution of the curing catalyst in (B).

20. The method in accordance with claim 18 in which the polydiorganosiloxane is a hydroxyl terminated polydimethylsiloxane, the silicon compound is an alkoxy silane and the curing catalyst is a tin carboxylate.

21. The method in accordance with claim 20, in which the organic solvent solution of tin carboxylate also contains alkoxysilane.

22. The method in accordance with claim 21 in which the substrate is selected from the group consisting of glass, metal, paper, rubber, resin, wood and ceramic.

23. The method in accordance with claim 22 in which the substrate is glass.

24. The method in accordance with claim 23 in which the glass is glass cloth.

25. The method in accordance with claim 22 in which the substrate is metal.

26. The method in accordance with claim 22 in which the metal is elected from the group consisting of copper, aluminum and steel.

27. The method in accordance with claim 26 in which the substrate is a screen.

28. The method in accordance with claim 17 in which cross-linking agent also is present in the organic solvent solution of the curing catalyst in (B).

29. The method in accordance with claim 17 wherein a filler is present in at least one of the uncatalyzed organosiloxane elastomer compositions.

30. The method in accordance with claim 4 in which at least one of the uncatalyzed organosiloxane elastomer compositions consists essentially of a polydiorganosiloxane having terminal radicals selected from the group consisting of hydroxyl radicals and triorganosiloxy radicals and having at least two vinyl radicals per molecule, and cross-linking organosilicon compounds having at least two silicon-bonded hydrogen atoms per molecule.

31. The method in accordance with claim 4 wherein the organic solvent dispersion of the uncatalyzed organosiloxane elastomer composition of (A) is the same as the organic solvent dispersion of the uncatalyzed organosiloxane elastomer composition of (C).

32. The method in accordance with claim 4 wherein the organic solvent dispersion of the uncatalyzed organosiloxane elastomer composition of (A) is not the same as the organic solvent dispersion of the uncatalyzed organosiloxane elastomer composition of (C).

33. The method in accordance with claim 4 wherein after (D), steps (B), (C) and (D) are repeated whereby a substantial increase in the thickness of the organosiloxane elastomer is obtained on the surface of the substrate.

34. The method in accordance with claim 33 wherein after (D) and before (B) the coated substrate is exposed to an air atmosphere for at least one minute.

35. The method in accordance with claim 4 wherein a release agent is applied to the surface of the substrate before (A) whereby the organosiloxane elastomer can be readily removed from the substrate.

36. The method in accordance with claim 35 in which the produce is cured.

37. The method in accordance with claim 36 in which the organosiloxane elastomer is removed from the substrate.

38. The method in accordance with claim 4 wherein the product of (D) is cured.

39. The method in accordance with claim 38 in which the cured organosiloxane elastomer is removed from the substrate.

40. The method in accordance with claim 4 in which the organic solvent dispersion in (C) is vibrated.

41. The method in accordance with claim 40 in which the organic solvent dispersion in (C) is vibrated during the placing of the coated substrate in the organic solvent dispersion and during the removal therefrom, there being no vibration of the organic solvent dispersion when the coated substrate is stationary in the organic solvent dispersion.

42. The method in accordance with claim 41 wherein a product of (D) is cured.

43. The method of claim 4 in which the substrate is selected from a group consisting of glass, metal, paper, rubber, resin, wood and ceramic.

44. A method of growing silicone elastomer on a substrate comprising

A. dipping the substrate in an organic solvent dispersion of an uncatalyzed organosiloxane elastomer composition which consists essentially of an organosiloxane polymer and a filler whereby a thin coating of the uncatalyzed organosiloxane elastomer composition is formed on the surface of the substrate, B. dipping the substrate which is coated with a thin coat of the uncatalyzed organosiloxane elastomer composition in an organic solvent solution of a cross-linker for the organosiloxane polymer and a curing catalyst for the organosiloxane polymer and cross-linker combination, whereby curing catalyst and cross-linker diffuse into and adhere on the thin coat of the uncatalyzed organosiloxane elastomer composition on the substrate, thereafter C. placing the coated substrate resulting from (B) in an organic solvent dispersion of an uncatalyzed organosiloxane elastomer composition for at least one minute whereby an organosiloxane elastomer grows on the surface of the catalyst-containing thin coat on the substrate, and thereafter, D. removing the coated substrate from the organic solvent dispersion of the uncatalyzed organosiloxane elastomer composition.

45. The method in accordance with claim 44 in which the uncatalyzed organosiloxane elastomer composition of (C) is the same as the uncatalyzed organosiloxane elastomer composition of (A).

46. The method in accordance with claim 45 in which the cross-linker is trimethoxysilane.

47. The method in accordance with claim 44 in which the cross-linker is trimethoxysilane.

* * * * *